(12) United States Patent
Kim et al.

(10) Patent No.: US 11,782,653 B2
(45) Date of Patent: Oct. 10, 2023

(54) IMAGE FORMING APPARATUS SELECTIVELY APPLYING ECO MODE

(71) Applicant: HEWLETT-PACKARD DEVELOPMENT COMPANY, L.P., Spring, TX (US)

(72) Inventors: Junghoon Kim, Seongnam-si (KR); Sooyoung Kang, Seongnam-si (KR); Mijin Kang, Seongnam-si (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/761,276

(22) PCT Filed: Sep. 2, 2020

(86) PCT No.: PCT/US2020/049021
§ 371 (c)(1),
(2) Date: Mar. 17, 2022

(87) PCT Pub. No.: WO2021/137899
PCT Pub. Date: Jul. 8, 2021

(65) Prior Publication Data
US 2022/0374178 A1 Nov. 24, 2022

(30) Foreign Application Priority Data
Dec. 30, 2019 (KR) .......................... 10-2019-0177323

(51) Int. Cl.
*G06F 3/12* (2006.01)
*H04N 1/23* (2006.01)

(52) U.S. Cl.
CPC .......... *G06F 3/1218* (2013.01); *G06F 3/1256* (2013.01); *G06F 3/1258* (2013.01); *H04N 1/2369* (2013.01); *G06F 3/1287* (2013.01)

(58) Field of Classification Search
CPC .... G06F 3/1241; G06F 3/1243; G06F 3/1218; G06F 3/1256; G06F 3/1258;
(Continued)

(56) References Cited

U.S. PATENT DOCUMENTS 8,248,657 B2 * 8/2012 Kunihiro ................ G06K 15/02
358/1.9
8,325,365 B2 12/2012 Saito
(Continued)

FOREIGN PATENT DOCUMENTS

JP 2009-57208 A 3/2009
JP 2017-44985 A 3/2017
(Continued)

*Primary Examiner* — John R Wallace
(74) *Attorney, Agent, or Firm* — Brooks, Cameron & Huebsch, PLLC

(57) ABSTRACT

An operating method of an image forming apparatus includes: receiving an input to select a selective eco mode which selectively applies an eco mode during an image forming job of a document; obtaining at least one area to be excluded from application of the eco mode from a preview of the document according to execution of the selective eco mode; generating a mask in which an area corresponding to at least one area of the document is set in an array corresponding to a preview image of the document, based on information about the at least one area of the document; and outputting the document to which the selective eco mode is applied based on the mask.

17 Claims, 14 Drawing Sheets

(58) Field of Classification Search
CPC ............... G06F 3/1287; H04N 1/0044; H04N 1/00461; H04N 1/2369
See application file for complete search history.

(56) References Cited

U.S. PATENT DOCUMENTS

| | | |
|---|---|---|
| 9,733,873 B2 | 8/2017 | Maeda |
| 9,830,114 B2* | 11/2017 | Nara ..................... G06F 3/1256 |
| 2010/0265547 A1 | 10/2010 | Katou et al. |
| 2012/0076523 A1* | 3/2012 | Kojima .............. G03G 15/5004 399/81 |
| 2016/0112600 A1* | 4/2016 | Mashimo ................ G06T 11/60 358/3.28 |
| 2018/0270395 A1 | 9/2018 | Yamamoto et al. |
| 2018/0300093 A1* | 10/2018 | Ishida ................ H04N 1/00411 |

FOREIGN PATENT DOCUMENTS

| | | |
|---|---|---|
| JP | 2018-187870 A | 11/2018 |
| KR | 10-2013-0038007 A | 4/2013 |
| WO | WO-2019/198882 A1 | 10/2019 |

* cited by examiner

```
Struct Rect {
    int x,    // -------- ①
        y,    // -------- ②
        width,  // -------- ③
        height; // -------- ④
};
```

420

```
Struct Page {
    int page;       // -------- ⑤
    Rect* rect_array; // -------- ⑥
};
```

430

```
Struct Masking {
    Page* page_array; // -------- ⑦
};
```

```
Class EventHandler {
    Void handleEvent(Event* event);    ------①
};

Void EventHandler::handleEvent(Event* event) {
    Int eventType = event->type;    ------②
    Switch (eventType) {
        Case TOUCH_DOWN:    ------③
            beginX = event->x;
            beginY = event->y;
            Break;
        Case TOUCH_UP:
            If (!mMaksing.page_array.contains(currentPage)) {
                mMasking.page_array.append(new Page(page_number));
            }
            mMasking.page_array[page].rect_array.append(new Rect(beginX, beginY, event->x – beginX, event->y – beginY));    ------④
            Break;
    }
}
```

510 void OCR::getAutoContentArea(Image* preview, Rect* rectText, Rect* rectImage);

```
enum {unmasked = 0, masked = 1} Mask;
```

660

```
Mask mask[page.width][page.height] = {Mask.unmasked};
For (int i = 0; i < masking.page_array.length; ++i) {
   For (int k = 0; k < masking.page_array[i].rect_array.length; ++k) {
      For (o = 0; o < masking.page_array[i].rect_array[k].height; ++o) {
         mask[masking.page_array[i].rect_array[k].x][o] = Mask.masked;
      }
   }
}
```

```
int** masking() {
    For (int i = 0; i < page.width; ++i) {
        For (int k = 0; k < page.height; ++k) {
            If (mask[i][k] == Mask.masked) ecoImage[i][k] = previewImage[i][k];
        }
    }

Return ecoImage;
}
```

IMAGE FORMING APPARATUS SELECTIVELY APPLYING ECO MODE

BACKGROUND

An image forming apparatus may support an eco mode for outputting printed matter in black and white during printing. When the eco mode is executed in the image forming apparatus, the image forming apparatus may output a document as printed matter having a black and white image in spite of a print job command of a document having a color image.

BRIEF DESCRIPTION OF DRAWINGS

The above and other aspects, features, and advantages of certain examples of the disclosure will be more apparent from the following description taken in conjunction with the accompanying drawings, in which:

FIG. 4B is a view for describing a function of generating a masking structure used for generating a mask, according to an example;

FIG. 4C is a view for describing a function of generating a masking structure when setting an area to be excluded from application of an eco mode in a preview image, according to an example;

FIG. 6B is a view for describing a function of generating a mask in an image forming apparatus, according to an example;

FIG. 7B is a view for describing a function of outputting printed matter to which a selective eco mode is applied in an image forming apparatus, according to an example;

DETAILED DESCRIPTION

An "image forming apparatus" may be any apparatus capable of performing an image forming job, such as a printer, a scanner, a fax machine, a multi-function printer (MFP), or a display device. A "job performed in the image forming apparatus" may be a job related to printing, copying, scanning, faxing, storing, sending, and the like.

Below, a detailed description will be given about examples of the disclosure with reference to attached drawings such that those of ordinary skill in the art may easily perform examples. In this regard, the present disclosure may have different forms and should not be construed as being limited to the descriptions set forth herein.

Figure 1:
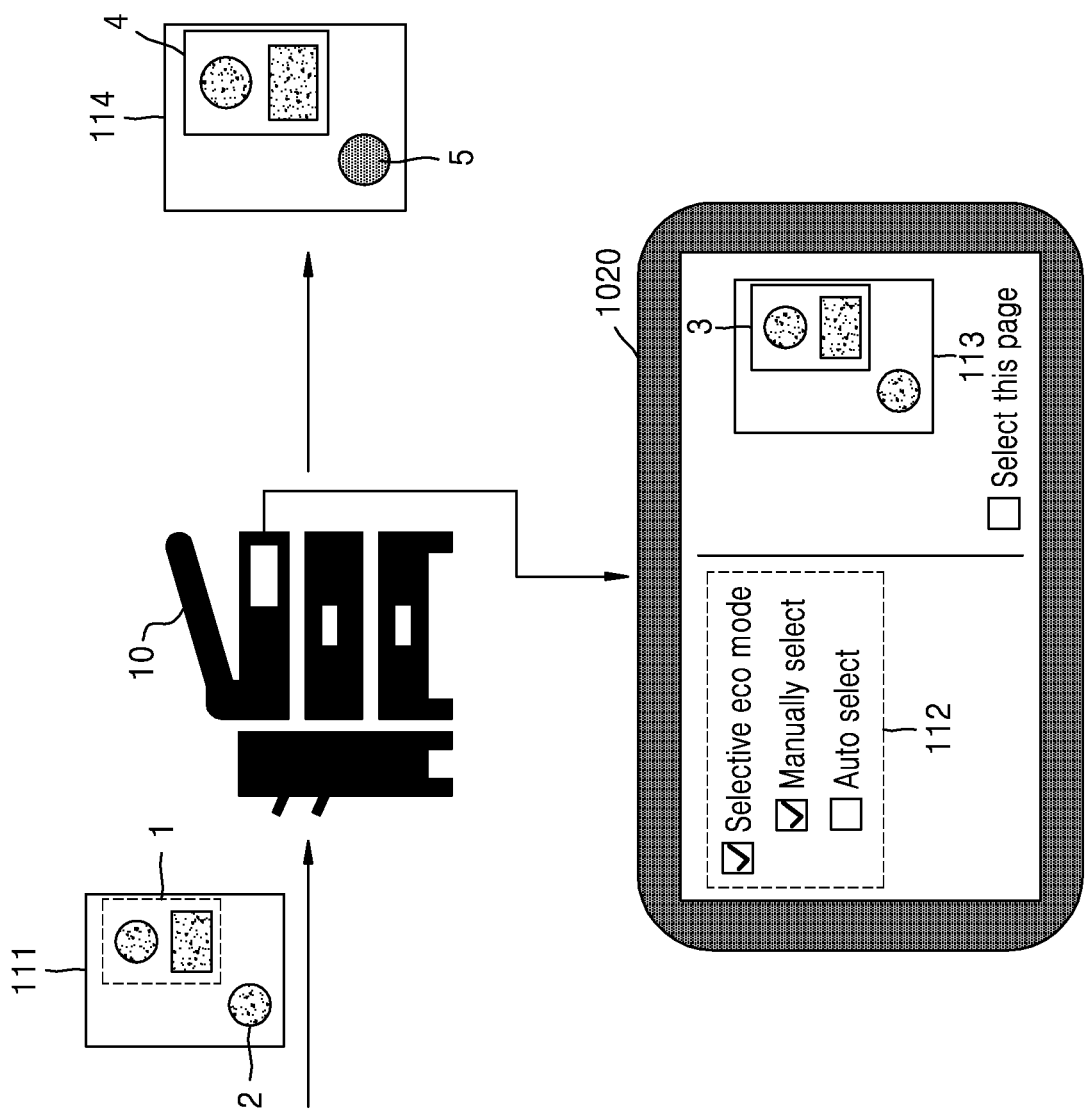
FIG. 1 is a conceptual diagram illustrating an operation of an image forming apparatus for outputting printed matter of a document by selectively applying an eco mode during a print job of the document, according to an example.

FIG. 1 is a conceptual diagram illustrating an operation of an image forming apparatus for outputting printed matter of a document by selectively applying an eco mode during a print job of the document, according to an example.

Referring to FIG. 1, an image forming apparatus 10 may receive a command of a print job for a document 111. The document 111 may include a first color image 1 and a second color image 2. For example, the image forming apparatus 10 may receive a command to apply an eco mode not to the first color image 1 but to the second color image 2 through a user interface device (or user interface) 1020. For example, the eco mode may be a mode in which an image forming job is performed by applying black and white colors instead of the original colors. When the eco mode is executed, printed matter to which the eco mode is applied may be output to the entire document. On the other hand, when a selective eco mode is executed, the printed matter to which the eco mode is applied may be output only to an area selected from the document or to an area other than the selected area.

For example, the user interface device 1020 may display a preview including an interface 112 for selecting the selective eco mode and a preview image 113 of the document. The user interface device 1020 may receive a command for executing the selective eco mode by manual selection. The user interface device 1020 may receive an input for setting an area 3 corresponding to the first color image 1 in the preview image 113 as an area to be excluded from application of the eco mode.

The image forming apparatus 10 may output printed matter 114 of the document 111 by applying the eco mode to the remaining areas except for the area 3 corresponding to the first color image 1. For example, an area 4 corresponding to the first color image 1 in the printed matter 114 may be output by applying the original color of the document 111, while an area 5 corresponding to the second color image 2 may be output by applying black and white colors rather than the original color of the document 111.

Figure 2:
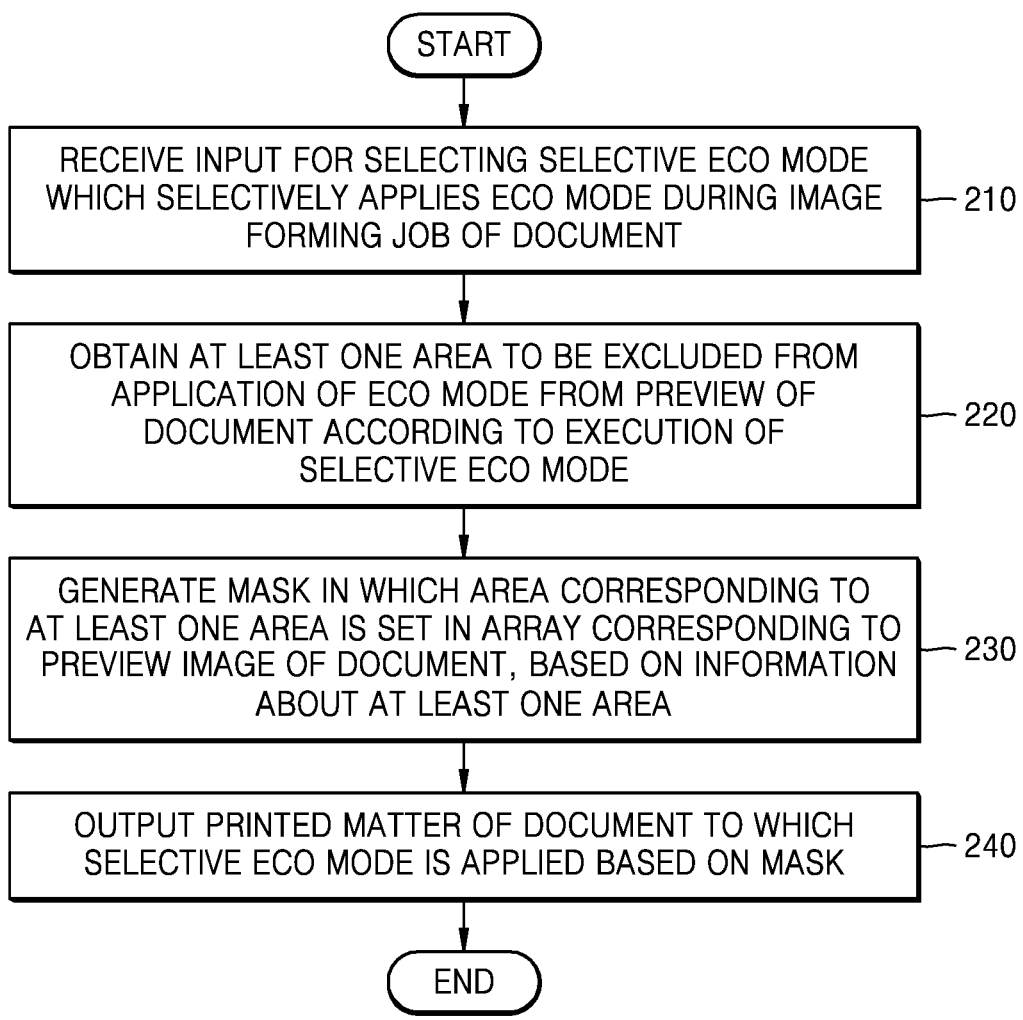
FIG. 2 is a flowchart illustrating an operating method of an image forming apparatus for outputting printed matter to which a selective eco mode is applied, according to an example.

FIG. 2 is a flowchart illustrating an operating method of the image forming apparatus 10 for outputting printed matter to which a selective eco mode is applied, according to an example.

Referring to FIG. 2, in operation 210, the image forming apparatus 10 may receive an input for selecting a selective eco mode for selectively applying an eco mode in an image forming job of a document.

For example, when the eco mode is executed in the image forming apparatus 10, the image forming apparatus 10 may apply the eco mode only to a certain area of a document rather than to all areas of the document. The image forming apparatus 10 may display, on the user interface device 1020, an interface capable of executing the selective eco mode.

In operation 220, the image forming apparatus 10 may obtain at least one area of the document to be excluded from application of the eco mode from a preview of the document according to the execution of the selective eco mode.

For example, the image forming apparatus 10 may display a preview including an interface for selecting at least one area of the document and a preview image of the document. The image forming apparatus 10 may receive an input for selecting at least one area of the document based on at least one of the interface and the preview image. An exemplary view of the preview will be described in FIG. 3.

For example, at least one area to be excluded from application of the eco mode in the document may be set based on a user input. For example, the image forming apparatus 10 may receive an input for selecting a start point to apply the selective eco mode and an end point to apply the selective eco mode corresponding to at least one area of the document based on the preview image. For example, the input for selecting the start point and the end point may be an input generated by at least one of tapping, double tapping, pressing, panning, swiping, flicking, drag-and-drop, pinch-in/out, and rotating. This example will be described in FIG. 4A.

In another example, at least one area to be excluded from application of an eco mode in the document may be set according to selection of a parameter in a list. For example, the parameter may be a page, text, image, or the like in the document. For example, the image forming apparatus 10 may display an interface including a list from which pages, text, and images within a document may be selected. The image forming apparatus 10 may receive an input for selecting at least one of a page, text, and an image corresponding to at least one area based on the list. This example will be described in FIG. 5A.

In operation 230, the image forming apparatus 10 may generate a mask in which an area corresponding to at least one area of the document is set in an array corresponding to a preview image of a document, based on information about at least one area.

For example, the image forming apparatus 10 may generate a masking structure based on the information about at least one area of the document. Here, the masking structure may store information about a page in which at least one area is set in the document and location information about the at least one area in the page.

For example, the image forming apparatus 10 may generate an array having the same size as that of a preview image. The image forming apparatus 10 may generate a mask by masking an area corresponding to at least one area in the array based on the masking structure. This example will be described in FIG. 6A.

In operation 240, the image forming apparatus 10 may output printed matter of a document to which a selective eco mode is applied based on a mask.

For example, the image forming apparatus 10 may generate a temporary image to which an eco mode is applied to a preview image. The image forming apparatus 10 may generate a final image to which the selective eco mode is applied by replacing a temporary area corresponding to at least one area in the temporary image with the original area corresponding to the at least one area, based on the mask. The image forming apparatus 10 may output the final image as printed matter. This example will be described in FIG. 7A.

Moreover, in the selective eco mode of FIG. 2, the image forming apparatus 10 sets an area to be excluded from the application of the eco mode and applies the eco mode to an area other than the set area has been described. However, the image forming apparatus 10 may set an area to which the eco mode is to be applied and may execute a selective eco mode in which the eco mode is applied to the set area.

By setting the area to be excluded from the application of the eco mode or the area to which the eco mode is to be applied in a document, the image forming apparatus 10 may selectively apply the eco mode only to a portion of the document but not the entire area of the document. Therefore, the image forming apparatus 10 may save toner and improve the quality of printed matter by selectively applying the eco mode to areas other than those in which high quality is required in the document.

Figure 3:
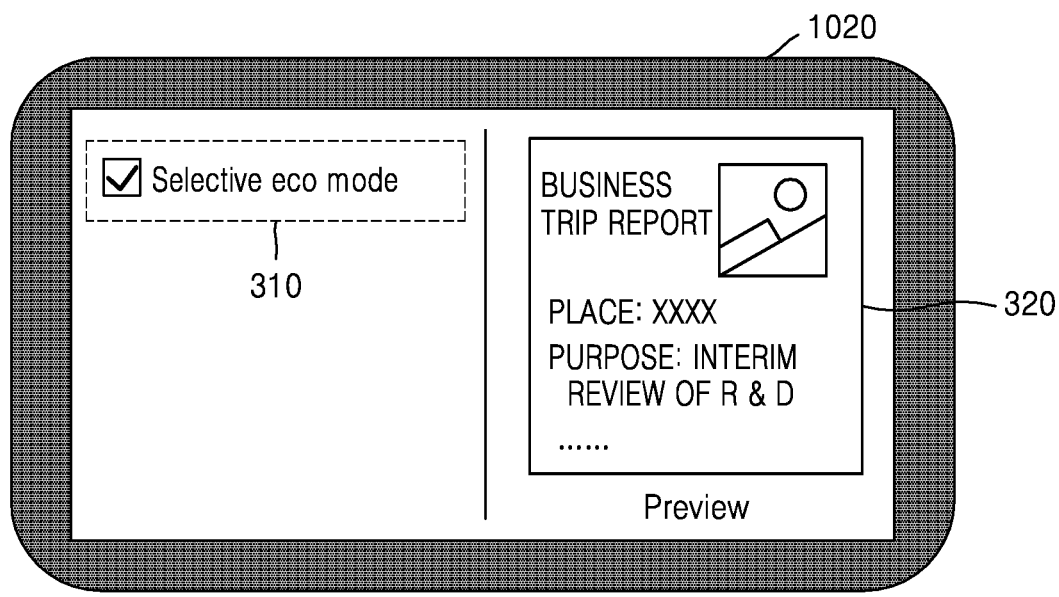
FIG. 3 is a view for describing an example of displaying a preview of a document in an image forming apparatus, according to an example.

FIG. 3 is a view for describing an example of displaying a preview of a document in the image forming apparatus 10, according to an example.

For example, the image forming apparatus 10 may receive an input for executing an eco mode. The image forming apparatus 10 may display a screen on which a selective eco mode may be set through the user interface device 1020 of the image forming apparatus 10.

In another example, the image forming apparatus 10 may receive a request for a print job of a first document from the image forming apparatus 10 or from an external device. The image forming apparatus 10 may display a screen for guiding the selective eco mode before proceeding with the print job of the first document, based on the amount of toner to be consumed due to the print job of the first document or an image in the first document. For example, when there is an image in the first document, the image forming apparatus 10 may display the screen on which the selective eco mode may be set through the user interface device 1020 of the image forming apparatus 10.

Referring to FIG. 3, the image forming apparatus 10 may display a preview including an interface 310 for selecting a selective eco mode and a preview image 320 of a document.

For example, the interface 310 may include an icon for selecting an on state or an off state of the selective eco mode. The preview image 320 of the document may also be provided as a preview of a document to be printed. In addition, when there is content to be corrected in a document, a user may correct the content in the preview image 320. In addition, as shown in FIG. 3, the image forming apparatus 10 may receive an input for selecting the selective eco mode.

Figure 4A:
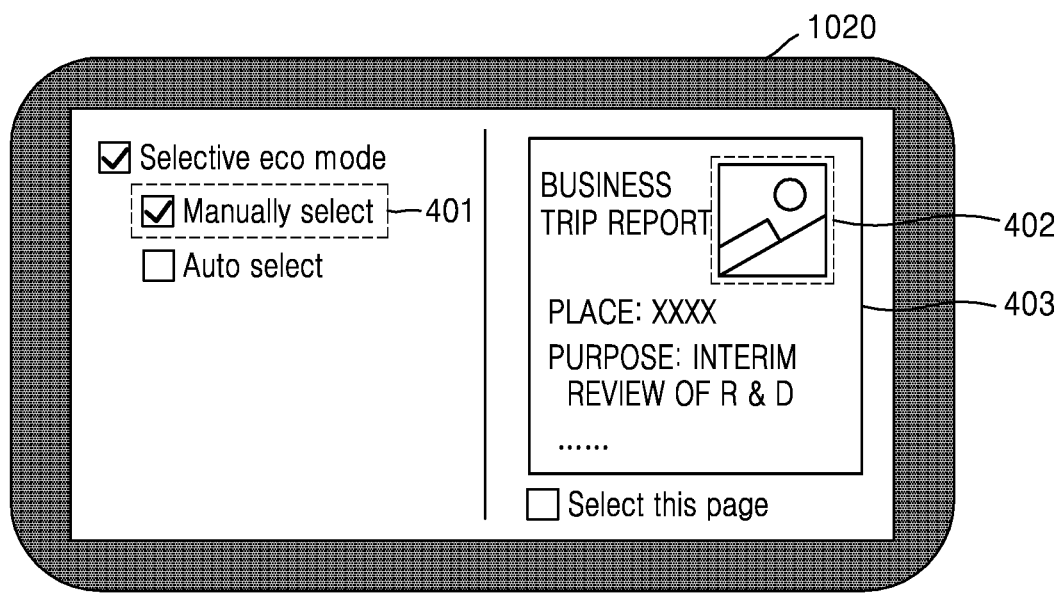
FIG. 4A is a view for describing an example of setting an area to be excluded from application of an eco mode according to execution of a selective eco mode in an image forming apparatus, according to an example.

FIG. 4A is a view for describing an example of setting an area to be excluded from application of an eco mode according to execution of a selective eco mode in the image forming apparatus 10, according to an example.

For example, when an input for selecting the selective eco mode is received, the image forming apparatus 10 may display an interface to choose whether to manually or automatically select an area to be excluded from application of an eco mode. For example, the image forming apparatus 10 may display a "manually select" item 401 and an "auto select" item.

Referring to FIG. 4A, the image forming apparatus 10 may receive an input for selecting the "manually select" item 401. The image forming apparatus 10 may receive an input for setting an area 402 to be excluded from application of an eco mode from a preview image 403 of a document. For example, the image forming apparatus 10 may receive an input for selecting a start point and an end point corresponding to the area 402 through the user interface device 1020 of the image forming apparatus 10. For example, the image forming apparatus 10 may receive an input for setting the area 402 as a drag-and-drop signal.

In addition, the image forming apparatus 10 may receive an input for selecting a "select this page" item, as shown in FIG. 4A. The image forming apparatus 10 may apply an eco mode to a selected page during an image forming job.

Moreover, when an input for selecting the "manually select" item 401 is not received, the image forming apparatus 10 may deactivate the preview image 403 such that the input for setting the area 402 to be excluded from the application of the eco mode is not received from the preview image 403.

FIG. 4B is a view for describing a function of generating a masking structure used for generating a mask, according to an example.

Table 410 of FIG. 4B shows a function for storing an area structure indicating location information about an area to be excluded from application of an eco mode. For example, the location information about the area to be excluded from the application of the eco mode may be stored as a rectangular area. For example, the area structure may be stored as (x, y, width, and height). Here, x (①) may be a value of an X coordinate system for a start point of an area, and y (②) may be a value of a Y coordinate system for the start point of the area. In addition, width (③) may be a width value of the area, and height (④) may be a height value of the area.

Table 420 of FIG. 4B shows a function for storing a page structure indicating information about a page where the area to be excluded from the application of the eco mode is set. For example, the page structure may be stored as page (⑤) where the area to be excluded from the application of the eco mode is set, and array (⑥) of the area structure where the location information of the area is stored.

Table 430 of FIG. 4B shows a function for storing a masking structure. For example, the masking structure may be stored as array (⑦) of page structures.

FIG. 4C is a view for describing a function of generating a masking structure when setting an area to be excluded from application of an eco mode in a preview age, according to an example.

As described in FIG. 4A, when an input for selecting the "manually select" item 401 is received in the image forming apparatus 10, the image forming apparatus 10 may register an event handler with the preview image 403. Block (①) in table 440 of FIG. 4C shows a function of the event handler.

Referring to block (①) in table 440 of FIG. 4C, the event handler may detect an event type. Referring to block (③), when there is a touch down signal, the event handler may detect the x coordinate and the y coordinate corresponding to the touch down signal as start points of an area.

Referring to block (④) in table 440 of FIG. 4C, when there is a touch up signal, the event handler may detect the x coordinate and the y coordinate corresponding to the touch up signal as end points of the area. The event handler may generate an area structure in which location information of an area to be excluded from application of an eco mode is stored, based on the start points and the end points. The event handler may obtain a current page corresponding to the area to be excluded from the application of the eco mode from an array of page structures in a masking structure, and may store the area structure in the current page. On the other hand, in the array of the page structures in the masking structure, when there is no current page corresponding to the area to be excluded from the application of the eco mode, the event handler may add the current page to the masking structure and save the area structure in the current page.

Figures 5A, 5B:
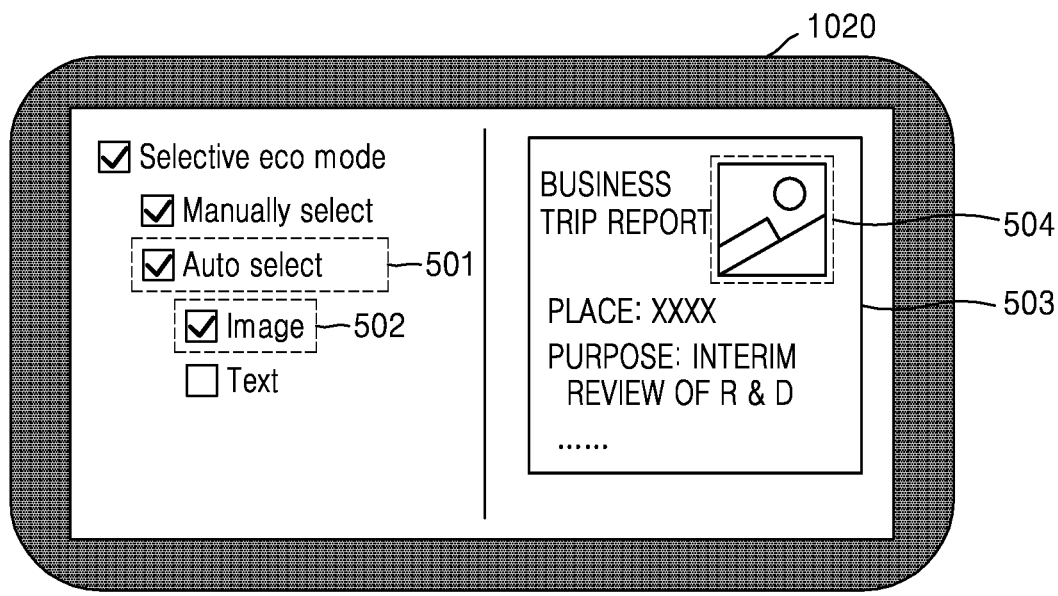
FIG. 5A is a view for describing an example of setting an area to be excluded from application of an eco mode according to execution of a selective eco mode in an image forming apparatus, according to another example.
FIG. 5B is a view for describing a function of separating an image and a text from a preview image, according to an example.

FIG. 5A is a view for describing an example of setting an area to be excluded from application of an eco mode according to execution of a selective eco mode in the image forming apparatus 10, according to another example.

Referring to FIG. 5A, the image forming apparatus 10 may receive an input for selecting an "auto select" item 501. When the "auto select" item 501 is selected, the image forming apparatus 10 may display a list of items capable of "auto select". For example, the image forming apparatus 10 may display a list including the "image" item 502 and a "text" item as a sub item of the "auto select" item 501.

For example, when an input for selecting the "image" item 502 is received through the user interface device 1020, within a preview image 503 of a document displayed on the user interface device 1020, an area of a first image 504 may be set as an area to be excluded from application of the eco mode.

In another example, when an input for selecting the "text" item is received through the user interface device 1020, within the preview image 503 of the document, an area other than the area of the first image 504 may be set as an area to be excluded from application of the eco mode.

FIG. 5B is a view for describing a function of separating an image and a text from a preview image, according to an example.

As described in FIG. 5A, when the input for selecting the "auto select" item 501 is received, the image forming apparatus 10 may divide the area of the document into an area of text and an area of an image based on an optical character recognizer (OCR). The image forming apparatus 10 may generate each of the area of the text and the area of the image as an array of area structures. A table 510 of FIG. 5B shows a function that is divided into an area of text and an area of an image using a preview, and stored as an array of area structures.

Figure 6A:
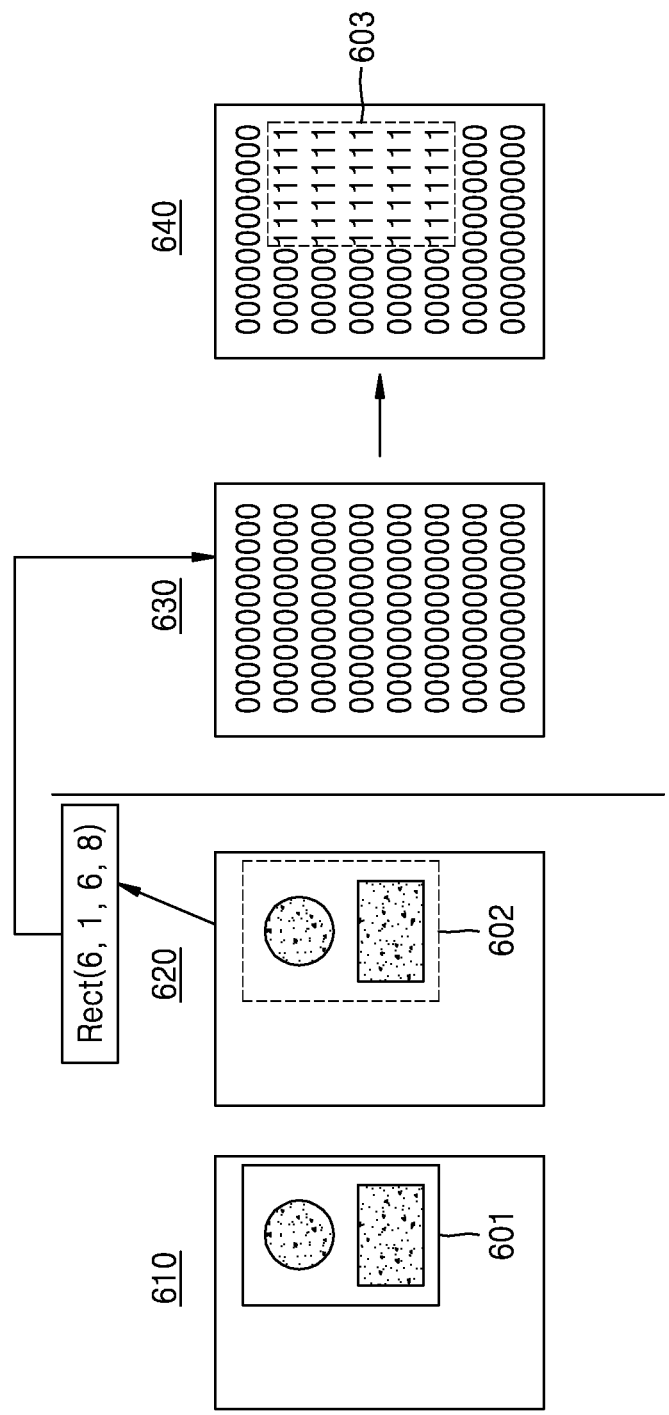
FIG. 6A is a view for describing a process of generating a mask in an image forming apparatus, according to an example.

FIG. 6A is a view for describing a process of generating a mask in the image forming apparatus 10, according to an example.

The image forming apparatus 10 may receive a request for an image forming job for a document including an image 601. In this case, the image forming apparatus 10 may execute a selective eco mode so that the image 601 in the document may be excluded from application of an eco mode. The image forming apparatus 10 may obtain information about an area to be excluded from the application of the eco mode based on a preview image 610 of the document.

For example, the user interface device 1020 of the image forming apparatus 10 may display the preview image 610 of the document. The user interface device 1020 may receive an input for selecting an area 602 of the image 601 in the preview image 610. The image forming apparatus 10 may obtain an area structure indicating location information of the area 602 based on a preview image 620 in which the area 602 of the image 601 is selected. The area structure may be obtained by (x, y, width, and height).

For example, when a coordinate value of x of the position of a start point of the area 602 is 6, a coordinate value of y is 1, a width of the area 602 is 6, and a height of the area 602 is 8, the image forming apparatus 10 may obtain Rect (6, 1, 6, 8) as a value of the area structure. The image forming apparatus 10 may generate a masking structure including page information where the area 602 is set and information about the area structure for the area 602.

The image forming apparatus 10 may generate an array 630 having the same size as that of the preview image 610. In this case, 0 may be stored in all areas as an initial value in the array 630. The image forming apparatus 10 may generate a mask 640 by masking an area 603 in the array 630 corresponding to the area 602 based on the masking structure. For example, in the mask 640, the masked area 603 may be stored as 1 and an unmasked area may be stored as 0, FIG. 6B is a view for describing a function of generating a mask in the image forming apparatus 10, according to an example.

A table 650 of FIG. 6B shows a function for generating a mask by storing selected areas as 1 and storing unselected areas as 0 based on a masking structure.

Referring to a table 660 of FIG. 6B, the image forming apparatus 10 may generate a mask by masking an area in an array corresponding to an area set on each page of a document, based on the masking structure using the function for generating a mask.

Figure 7A:
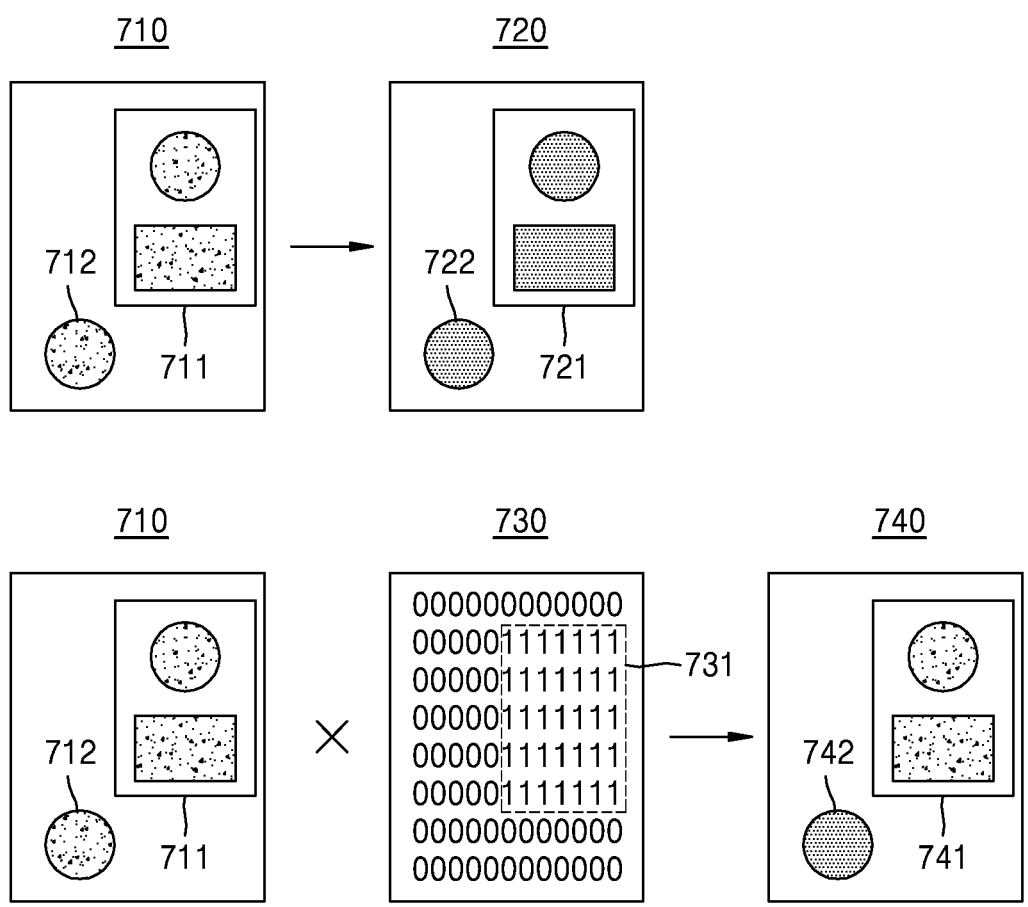
FIG. 7A is a view for describing a process of outputting printed matter to which a selective eco mode is applied in an image forming apparatus, according to an example.

FIG. 7A is a view for describing a process of outputting printed matter to which a selective eco mode is applied in the image forming apparatus 10, according to an example.

Referring to FIG. 7A, the image forming apparatus 10 may generate a temporary image 720 to which an eco mode is applied in a preview image 710. The temporary image 720 may be an image in which the eco mode is entirely applied to the preview image 710. For example, the preview image 710 of the document may include a first color image 711 and a second color image 712. For example, when the eco mode is applied to the temporary image 720, a first temporary area 721 corresponding to the first color image 711 and a second temporary area 722 corresponding to the second color image 712 in the temporary image 720 may reflect black and white colors instead of the original colors.

Moreover, the image forming apparatus 10 may receive an input for selecting an area of the first color image 711 as an area to be excluded from application of the eco mode from the preview image 710. The image forming apparatus 10 may generate a mask 730 in which an area 731 corresponding to the area of the first color image 711 is masked.

The image forming apparatus 10, based on the area 731 in the mask 730, may generate a final image 740 by replacing the first temporary area 721 in the temporary image 720 with the area of the first color image 711 of the preview mage 710. As shown in FIG. 7A, the eco mode may not be applied to an area 741 in the final image 740, and the eco mode may be applied to an area 742. Here, the area 741 is an area corresponding to the area of the first color image 711, and the area 742 is an area corresponding to the area of the second color image 712.

FIG. 7B is a view for describing a function of outputting printed matter to which a selective eco mode is applied in the image forming apparatus 10, according to an example.

A table 750 of FIG. 7B shows a function for generating a final image to which the selective eco mode is applied by replacing an area in a temporary image corresponding to an area set in a preview image with an area set in the preview image based on a mask. Here, the temporary image is an image to which an eco mode is applied to the preview image. The image forming apparatus 10 may output the final image as printed matter.

Figure 8:
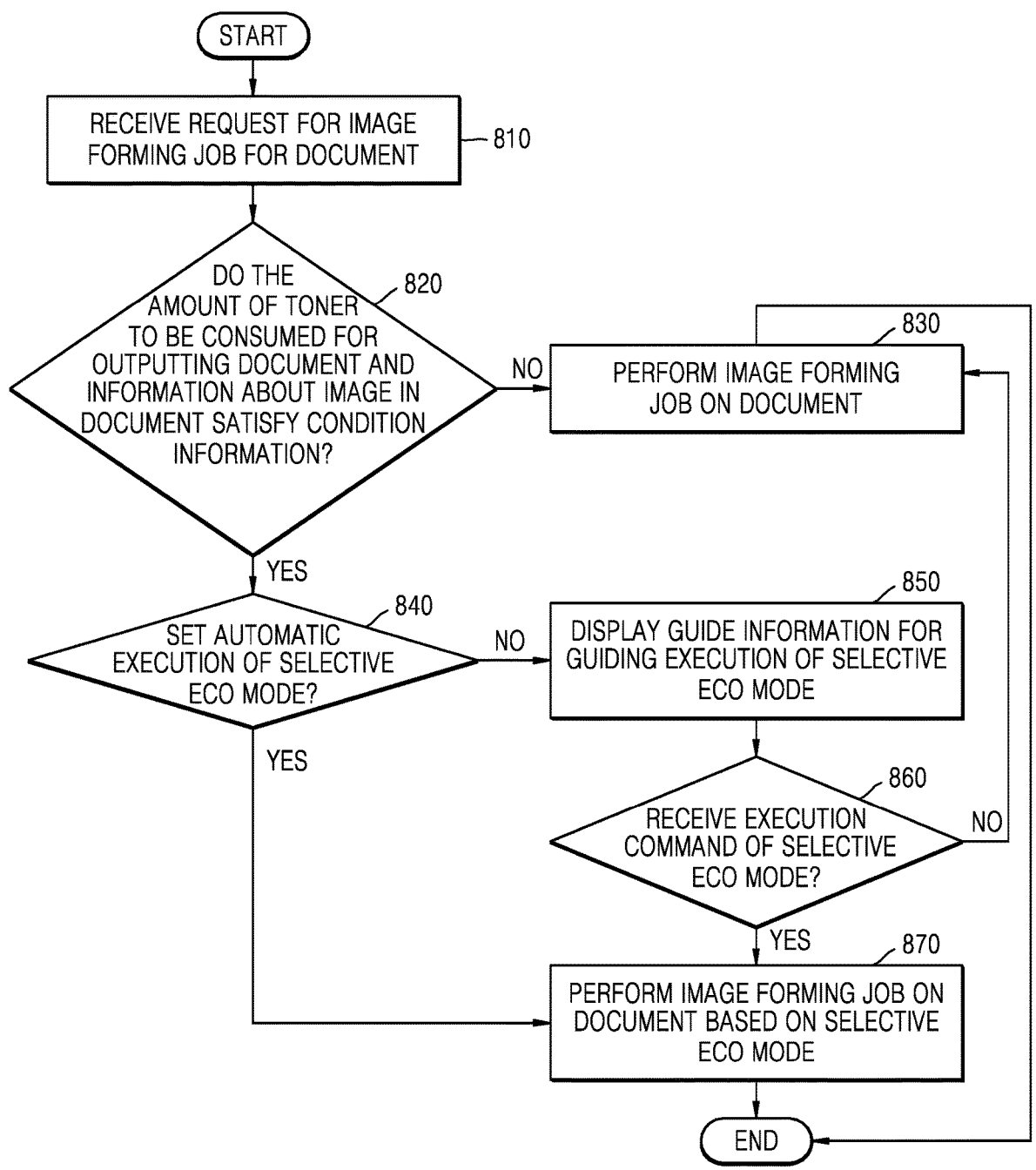
FIG. 8 is a flowchart illustrating an operating method of an image forming apparatus that executes a selective eco mode based on condition information, according to an example.

FIG. 8 is a flowchart illustrating an operating method of the image forming apparatus 10 that executes a selective eco mode based on condition information, according to an example.

Referring to FIG. 8, in operation 810 of the image forming apparatus 10, the image forming apparatus 10 may receive a request for an image forming job for a document.

In operation 820 of the image forming apparatus 10, the image forming apparatus 10 may check whether the amount of toner to be consumed for outputting the document and the information about an image in the document satisfy preset condition information. The image forming apparatus 10 may calculate the amount of toner to be consumed for outputting the document, may check a location where the image in the document exists and the range of an area of the image, and may obtain information about the amount of toner to be consumed and the image in the document.

For example, the condition information may be condition information for executing a selective eco mode for a layer that consumes a large amount of toner among a text layer and an image layer obtained based on the document.

In another example, the condition information may be condition information for executing the selective eco mode for a page that consumes more than a preset amount of toner among pages of the document.

In another example, the condition information may be condition information for executing the selective eco mode for a page with images exceeding a preset range or a page with color images in the document.

In another example, the condition information may be condition information for executing the selective eco mode to output a color similar to a first color by combining the first color with at least one color when the amount of toner for the first color is insufficient during the image forming job of the document. When the selective eco mode is in effect, the image forming apparatus 10, to output a color similar to the first color, may set a mixing ratio of the first color and the at least one color and perform the image forming job according to the set mixing ratio.

In another example, when there is a preset code or a preset graph in the document, the condition information may be condition information for executing the selective eco mode on codes and graphs other than the preset code or the preset graph.

Moreover, when information about the amount of toner to be consumed and an image in the document does not satisfy the preset condition information, the image forming apparatus 10 may perform an image forming job on the document without executing the selective eco mode according to operation 830 of the image forming apparatus 10.

On the other hand, when the information about the amount of toner to be consumed and the image in the document satisfies the preset condition information, the image forming apparatus 10 may check whether automatic execution of the selective eco mode is set according to operation 840 of the image forming apparatus 10. When the automatic execution of the selective eco mode is set, the image forming apparatus 10 may perform the image forming job on the document based on the selective eco mode according to operation 870 of the image forming apparatus 10.

When the automatic execution of the selective eco mode is set, the image forming apparatus 10 may display guide information for guiding execution of the selective eco mode according to operation 850 of the image forming apparatus 10. In operation 860 of the image forming apparatus 10, the image forming apparatus 10 may check whether an execution command of the selective eco mode is received. When no execution command of the selective eco mode is received, the image forming apparatus 10 may perform the image forming job on the document without executing the selective eco mode according to operation 830 of the image forming apparatus 10. When the execution command of the selective eco mode is received, the image forming apparatus 10 may perform the image forming job on the document based on the selective eco mode according to operation 870 of the image forming apparatus 10.

Figure 9A:
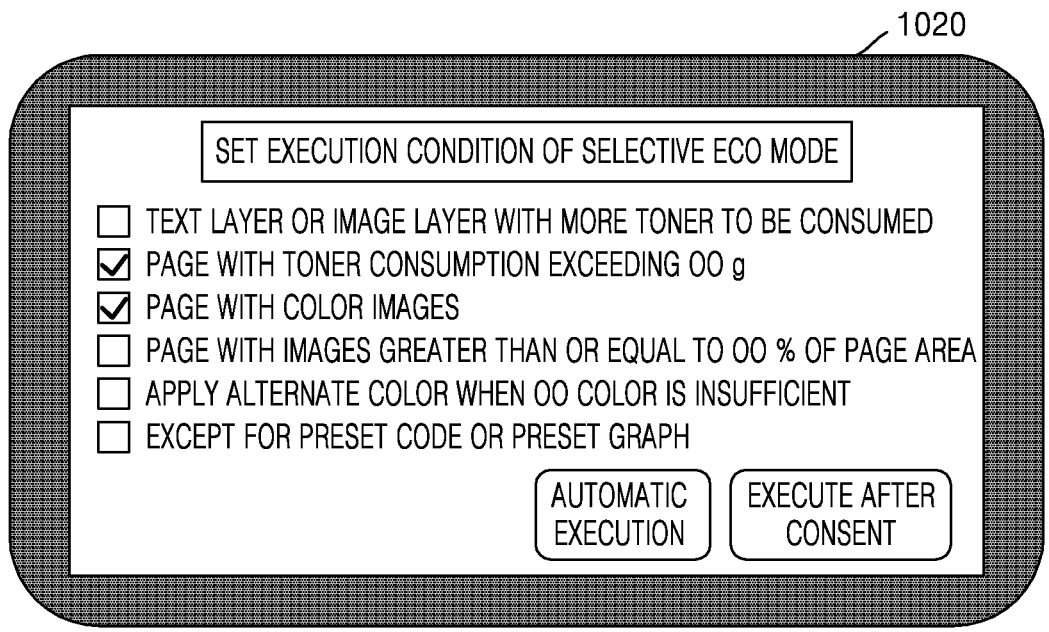
FIG. 9A is a view for describing a screen for setting a condition for executing a selective eco mode, according to an example.

FIG. 9A is a view for describing a screen for setting a condition for executing a selective eco mode, according to an example.

Referring to FIG. 9A, the image forming apparatus 10 may display a screen for setting a condition for executing the selective eco mode through the user interface device 1020. For example, the condition for executing the selective eco mode may include a condition for executing the selective eco mode on a text layer or an image layer with more toner to be consumed, a condition for executing the selective eco mode on a page with toner consumption exceeding OO g, a condition for executing the selective eco mode on a page with an image greater than or equal to OO % of a page area, a condition for executing the selective eco mode on a page with color images, a condition for executing the selective eco mode on a page with images greater than or equal to OO % of the page area, a condition for executing the selective eco mode to apply alternate colors when OO color is lacking, and a condition for executing the selective eco mode on codes and graphs other than a preset code or a preset graph.

The image forming apparatus 10 may display an interface from which each condition may be selected. As shown in FIG. 9A, the image forming apparatus 10 may receive an input for selecting the condition for executing the selective eco mode on the page with toner consumption exceeding OO g or the condition for executing the selective eco mode on the page with color images.

In addition, when the execution condition of the selective eco mode is satisfied, the image forming apparatus 10 may automatically execute the selective eco mode or may display an interface for selecting to execute after user consent. Referring to FIG. 9A, when an input for selecting "execute after consent" is received from the user interface device 1020, the image forming apparatus 10 may display information for guiding the execution of the selective eco mode when the execution condition of the selective eco mode is satisfied.

Figure 9B:
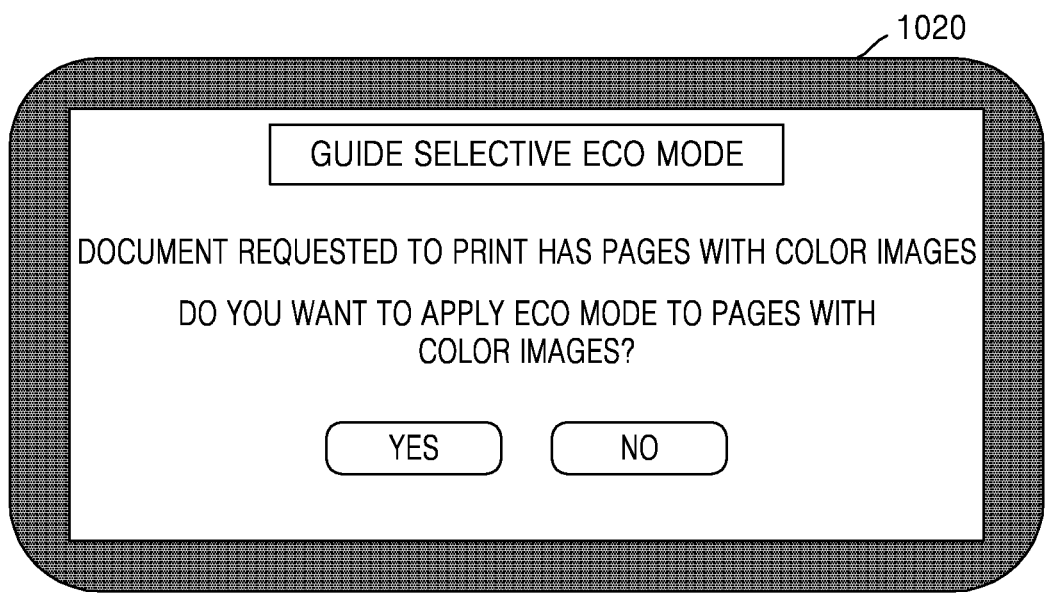
FIG. 9B is a view for describing a screen displaying information for guiding execution of a selective eco mode, according to an example.

FIG. 9B is a view for describing a screen displaying information for guiding execution of a selective eco mode, according to an example.

As shown in FIG. 9A, the image forming apparatus 10 may receive an input for selecting the condition for executing the selective eco mode on the page with toner consumption exceeding OO g or the condition for executing the selective eco mode on the page with color images. In addition, the image forming apparatus 10 may receive an input for selecting "execute after consent". For example, the image forming apparatus 10 may receive a command for requesting a print job of a document having a color image.

The image forming apparatus 10 may display information for guiding the execution of the selective eco mode, as shown in FIG. 9B. The image forming apparatus 10 may display the message "The document requested to print has pages with color mages. Do you want to apply an eco mode to the pages with color images?", When an input of selecting "Yes" is received, the image forming apparatus 10 may apply the eco mode to the color images to perform a print job.

Figure 10:
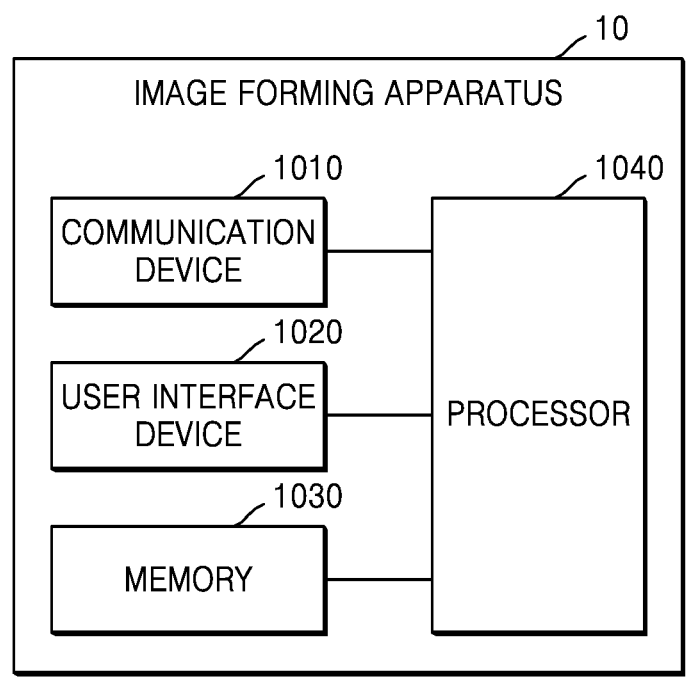
FIG. 10 is a block diagram of a configuration of an image forming apparatus, according to an example.

FIG. 10 is a block diagram of a configuration of the image forming apparatus 10, according to an example.

The image forming apparatus 10 shown in FIG. 10 may include a communication device 1010, a user interface device (or user interface) 1020, a memory 1030, and a processor 1040. However, the elements shown are not essential elements. Moreover, the image forming apparatus 10 may include the user interface device 1020 or may be in wired or wireless communication with the user interface device 1020. The image forming apparatus 10 may be embodied with more or less elements than the elements shown in the drawings. Hereinafter, the elements will be described.

The communication device 1010 may communicate with an external device. In more detail, the communication device 1010 may be connected to a network in a wired or wireless manner and may communicate with the external device. The external device may be an external server that manages the image forming apparatus 10 or an electronic device that requests a certain job from the image forming apparatus 10. The communication device 1010 may include a communication module that supports one of a variety of wired or wireless communication methods. For example, the communication module may also be a short-range communication module or a wired communication module.

The user interface device 1020 may include an input unit for receiving, from a user, an input for controlling the operation of the image forming apparatus 10, and an output unit for displaying information, such as a result of the operation of the image forming apparatus 10 or a state of the image forming apparatus 10. For example, the user interface device 1020 may include an operation panel for receiving a user input, a display panel for displaying a screen, and the like.

In detail, the input unit may include at least one of devices for receiving various types of user inputs, such as a keyboard, a physical button, a touch screen, a camera, and a microphone. Also, the output unit may include, for example, a display panel or a speaker. However, an example is not limited thereto, and the user interface device 1020 may include a device supporting various inputs and outputs.

The memory 1030 may store software or programs. The memory 1030 may set an area to be excluded from application of an eco mode in a document and may store at least one program related to an operation of the image forming apparatus 10 that outputs printed matter in which the eco mode is applied only to an area other than the set area.

The processor 1040 may execute a program stored in the memory 1030, read data or a file stored in the memory 1030, or store a new file in the memory 1030. The processor 1040 may execute the instructions stored in the memory 1030.

The processor 1040 may receive an input for selecting a selective eco mode, which selectively applies an eco mode during an image forming job of the document, through the user interface device 1020.

For example, in a state where the eco mode is executed in the image forming apparatus 10, the processor 1040 may apply the eco mode only to a certain area, not to all areas of the document. The user interface device 1020 may display an interface capable of executing the selective eco mode.

The processor 1040 may obtain at least one area to be excluded from application of the eco mode from a preview of the document according to the execution of the selective eco mode.

For example, the user interface device 1020 may display a preview including an interface for selecting at least one area and a preview image of the document. The user interface device 1020 may receive an input for selecting at least one area based on at least one of the interface and the preview image.

For example, at least one area to be excluded from application of the eco mode in the document may be set based on a user input. For example, the user interface device 1020 may receive an input for selecting a start point and an end point corresponding to at least one area based on the preview image. For example, the input for selecting the start point and the end point may be an input generated by at least one of tapping, double tapping, pressing, panning, swiping, flicking, drag-and-drop, pinch-in/out, and rotating.

In another example, the at least one area to be excluded from the application of the eco mode in the document may be set according to selection of a parameter in a list. For example, the parameter may be a page, text, image, or the like in the document. For example, the user interface device 1020 may display an interface including a list from which pages, text, and images within a document may be selected. The user interface device 1020 may receive an input for selecting at least one of a page, text, and an image corresponding to at least one area based on the list.

The processor 1040 may generate a mask in which an area corresponding to at least one area is set in an array corresponding to a preview image of a document, based on information about the at least one area.

For example, the processor 1040 may generate a masking structure based on the information about the at least one area. Here, the masking structure may store information about a page in which at least one area is set in the document and location information about the at least one area in the page.

For example, the processor 1040 may generate an array having the same size as that of a preview image. The processor 1040 may generate a mask by masking an area corresponding to at least one area in the array based on the masking structure.

The processor 1040 may output printed matter of a document to which the selective eco mode is applied based on the mask.

For example, the processor 1040 may generate a temporary image to which an eco mode is applied in the preview image. The processor 1040 may generate a final image to which the selective eco mode is applied by replacing a temporary area corresponding to at least one area in the temporary image with the original area corresponding to the at least one area, based on the mask. The processor 1040 may output the final image as printed matter.

The processor 1040 may set an area to be excluded from the application of the eco mode based on a user input and may execute the selective eco mode in which the eco mode is applied to an area other than the set area. In addition, the processor 1040 may set an area to which the eco mode is to be applied based on a user input and may execute a selective eco mode to which the eco mode is applied to the set area.

The processor 1040 may receive a request for an image forming job for a document through the communication device 1010 or the user interface device 1020.

The processor 1040 may check whether the amount of toner to be consumed for outputting the document and information about an image in the document satisfy preset condition information. The processor 1040 may calculate the amount of toner to be consumed for outputting the document, may check a location where the image in the document exists and the range of an area of the image, and may obtain information about the amount of toner to be consumed and the image in the document.

For example, the condition information may be condition information for executing a selective eco mode for a layer that consumes a large amount of toner among a text layer and an image layer obtained based on the document.

In another example, the condition information may be condition information for executing the selective eco mode for a page that consumes more than a preset amount of toner among pages of the document.

In another example, the condition information may be condition information for executing the selective eco mode for a page with images exceeding a preset range or a page with color images in the document.

In another example, the condition information may be condition information for executing the selective eco mode to output a color similar to a first color by combining the first color with at least one color when the amount of toner for the first color is insufficient during the image forming job of the document. When the selective eco mode is in effect, the processor 1040, to output a color similar to the first color, may set a mixing ratio of the first color and the at least one color and perform the image forming job according to the set mixing ratio.

In another example, when there is a preset code or a preset graph in the document, the condition information may be condition information for executing the selective eco mode on codes and graphs other than the preset code or the preset graph.

Moreover, when information about the amount of toner to be consumed and an image in the document does not satisfy the preset condition information, the processor 1040 may perform an image forming job on the document without executing the selective eco mode.

On the other hand, when the information about the amount of toner to be consumed and the image in the document satisfies the preset condition information, the processor 1040 may check whether automatic execution of the selective eco mode is set. When the automatic execution of the selective eco mode is set, the processor 1040 may perform the image forming job on the document based on the selective eco mode.

When the automatic execution of the selective eco mode is not set, the processor 1040 may display guide information for guiding execution of the selective eco mode through the user interface device 1020. The processor 1040 may check whether an execution command of the selective eco mode is received. When no execution command of the selective eco mode is received, the processor 1040 may perform the image forming job on the document without executing the selective eco mode. When an execution command of the selective eco mode is received, the processor 1040 may perform the image forming job on the document based on the selective eco mode.

Moreover, the above-described operating method of the image forming apparatus 10 may be implemented in the form of a non-transitory computer-readable recording medium storing instructions or data executable by a computer or a processor. The examples may be written as computer programs and may be implemented in general-use digital computers that execute programs using the computer-readable recording medium. The computer-readable recording medium may include read only memory (ROM), random access memory (RAM), flash memory, CD-ROMs, CD-Rs, CD+Rs, CD-DVD-Rs, DVD-Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, or solid-state disks (SSDs), and may be any device capable of storing instructions or software, associated data, data files, and data structures, and providing the instructions or software, associated data, data files, and data structures to a processor or a computer such that the processor or computer may execute the instructions.

Although the examples have been described with reference to the accompanying drawings, those of ordinary skill in the art will understand that various changes and modifications may be made therein. For example, the relevant results may be achieved even when the described technologies are performed in a different order than the described methods, and/or even when the described elements such as systems, structures, devices, and circuits are coupled or combined in a different form than the described methods or are replaced or substituted by other elements or equivalents.

It should be understood that examples described herein should be considered in a descriptive sense only and not for purposes of limitation. Descriptions of features or aspects within each example should typically be considered as available for other similar features or aspects in other examples. While one or more examples have been described with reference to the figures, it will be understood by those of ordinary skill in the art that various changes in form and details may be made therein without departing from the spirit and scope as defined by the following claims.

What is claimed is:

1. A method of an image forming apparatus, the method comprising:
   receiving an input to select a selective eco mode which selectively applies an eco mode, to alter a document, during an image forming job of the document;
   obtaining at least one area of the document to be excluded from application of the eco mode from a preview of the document according to execution of the selective eco mode, wherein the obtaining of at least one area of the document to be excluded from application of the eco mode comprises:
      displaying the preview comprising an interface to select the at least one area and a preview image of the document; and
      receiving an input to select a start point and an end point corresponding to the at least one area of the document to be excluded based on at least one of the interface and the preview image;
   generating a mask in which the area corresponding to the at least one area of the document excluded from the application of the eco mode is set in an array corresponding to the preview image of the document, based on information about the at least one area of the document; and
   outputting the document to which the selective eco mode is applied based on the mask.

2. The method of claim 1, wherein excluding the at least one area from the application of the eco mode comprises:
   applying original color to the at least one area such that the at least one area is in original color.

3. The method of claim 2, wherein to alter the document the eco mode applies black and white color to the document instead of the original document color.

4. The method of claim 1, wherein the receiving of the input to select the at least one area based on at least one of the interface and the preview image comprises:
   displaying the interface comprising a list from which pages, text, and images within the document may be selected; and
   receiving an input to select at least one of a page, text, and an image corresponding to the at least one area based on the list.

5. The method of claim 1, further comprising generating a masking structure comprising information about a page in which the at least one area is set in the document and location information about the at least one area in the page, based on the information about the at least one area.

6. The method of claim 5, wherein the generating of the mask comprises:
   generating the array having the same size as that of the preview image; and
   generating the mask by masking an area corresponding to the at least one area in the array based on the masking structure.

7. The method of claim 1, wherein the outputting document to which the selective eco mode is applied based on the mask comprises:
   generating a temporary image to which the eco mode is applied in the preview image;
   generating a final image to which the selective eco mode is applied by replacing a temporary area corresponding to the at least one area in the temporary image with an original area corresponding to the at least one area, based on the mask; and
   outputting the final image as printed matter of the document.

8. The method of claim 1, further comprising executing the selective eco mode based on condition information set based on an amount of toner of at least one color to be consumed by the output of the document or an image in the document.

9. The method of claim 8, wherein the condition information comprises at least one of:
   condition information to execute the selective eco mode for a layer that consumes a specific amount of toner among a text layer and an image layer obtained based on the document;
   condition information to execute the selective eco mode for a page of the document that consumes more than a preset amount of toner;
   condition information to execute the selective eco mode for a page with images exceeding a preset range or a page with color images in the document;
   condition information to execute the selective eco mode to output a color similar to a first color by combining the first color with at least one color when the amount of toner for the first color is insufficient during the image forming job of the document; and
   condition information to execute the selective eco mode on codes and graphs other than a preset code or a preset graph in the document.

10. The method of claim 8, further comprising, when an execution condition is satisfied, automatically executing the selective eco mode or displaying guide information for guiding execution of the selective eco mode.

11. The method of claim 1, wherein receiving the input to select the start point and the end point corresponding to the at least one area based on the preview image comprises receiving the input for select the area as at least one of tapping, double tapping, pressing, panning, swiping, drag-and-drop, pinch-in/out, and rotating.

12. The method of claim 1, wherein the at least one area of the document is a portion of the document and the eco mode is applied to another portion of the document.

13. A non-transitory computer-readable storage comprising instructions that, when executed, cause a processor to:
   receive an input to select a selective eco mode which selectively applies an eco mode, to alter a document, during an image forming job of the document;

obtain at least one area of the document to be excluded from application of the eco mode from a preview of the document according to execution of the selective eco mode, wherein the obtaining of at least one area of the document to be excluded from application of the eco mode includes, causing the processor to:
   display the preview comprising an interface to select the at least one area and a preview image of the document; and
   receive an input to select a start point and an end point corresponding to the at least one area of the document to be excluded based on at least one of the interface and the preview image;
generate a mask in which the area corresponding to the at least one area of the document excluded from the application of the eco mode is set in an array corresponding to the preview image of the document, based on information about the at least one area of the document; and
output the document to which the selective eco mode is applied based on the mask.

14. An image forming apparatus comprising:
a user interface;
a memory to store instructions; and
a processor to execute the instructions to:
   receive, from the user interface, an input to select a selective eco mode to apply selectively an eco mode, to alter a document, during an image forming job of the document;
   obtain at least one area of the document to be excluded from application of the eco mode from a preview of the document according to execution of the selective eco mode, wherein the obtaining of at least one area of the document to be excluded from application of the eco mode includes:
     displaying the preview comprising an interface to select the at least one area and a preview image of the document; and
     receiving an input to select a start point and an end point corresponding to the at least one area of the document to be excluded based on at least one of the interface and the preview image;
   generate a mask in which the area corresponding to the at least one area of the document excluded from the application of the eco mode is set in an array corresponding to the preview image of the document, based on information about the at least one area of the document; and
   output the document to which the selective eco mode is applied based on the mask.

15. The image forming apparatus of claim 14, wherein the processor to execute the instructions to, through the user interface:
apply original color to the at least one area such that the at least one area is in original color.

16. The image forming apparatus of claim 14, wherein the processor to execute the instructions to:
generate a masking structure comprising information about a page in which the at least one area is set in the document and location information about the at least one area in the page, based on the information about the at least one area;
generate the array having the same size as that of the preview image; and
generate the mask by masking an area corresponding to the at least one area in the array based on the masking structure.

17. The image forming apparatus of claim 14, wherein the processor to execute the instructions to:
generate a temporary image to which the eco mode is applied in the preview image;
generate a final image to which the selective eco mode is applied by replacing a temporary area corresponding to the at least one area in the temporary image with an original area corresponding to the at least one area, based on the mask; and
output the final image as printed matter of the document.

* * * * *